Aug. 14, 1945.   F. KOVACS   2,382,069
APPARATUS FOR MANUFACTURING TIRES
Original Filed May 25, 1942   3 Sheets-Sheet 1
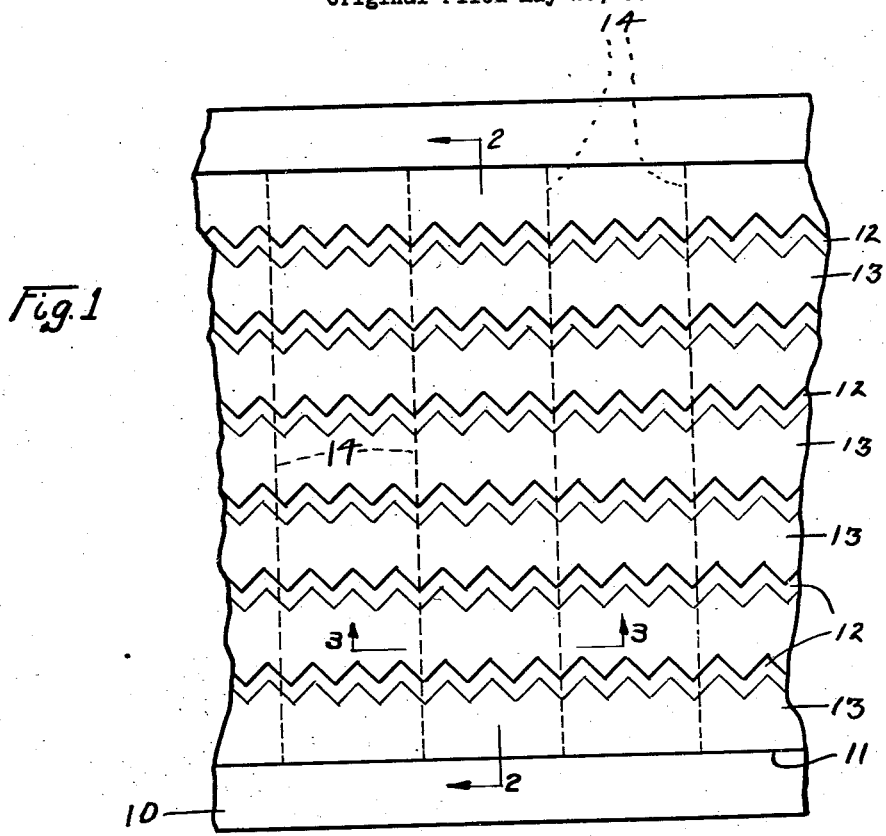
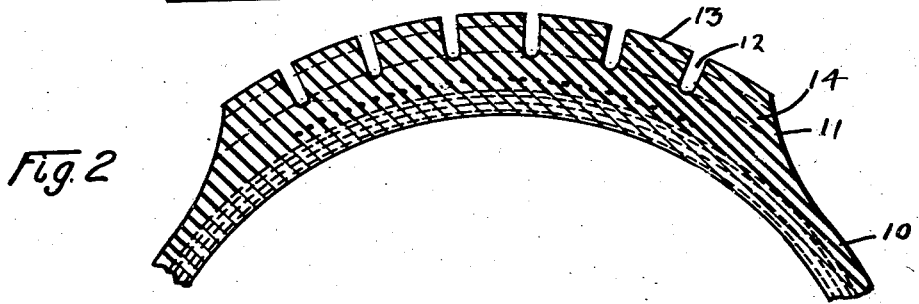
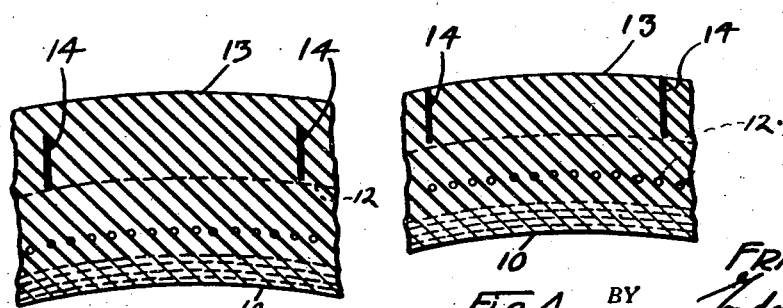
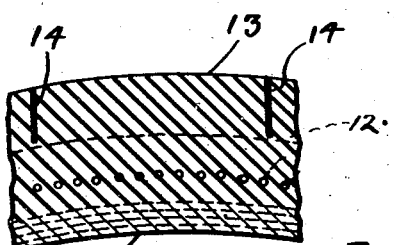
INVENTOR:
FRANK KOVACS.
BY
ATTORNEY.

Aug. 14, 1945.   F. KOVACS   2,382,069
APPARATUS FOR MANUFACTURING TIRES
Original Filed May 25, 1942   3 Sheets-Sheet 2

INVENTOR:
FRANK KOVACS.
BY
ATTORNEY.

Aug. 14, 1945.                F. KOVACS                    2,382,069
              APPARATUS FOR MANUFACTURING TIRES
        Original Filed May 25, 1942      3 Sheets-Sheet 3
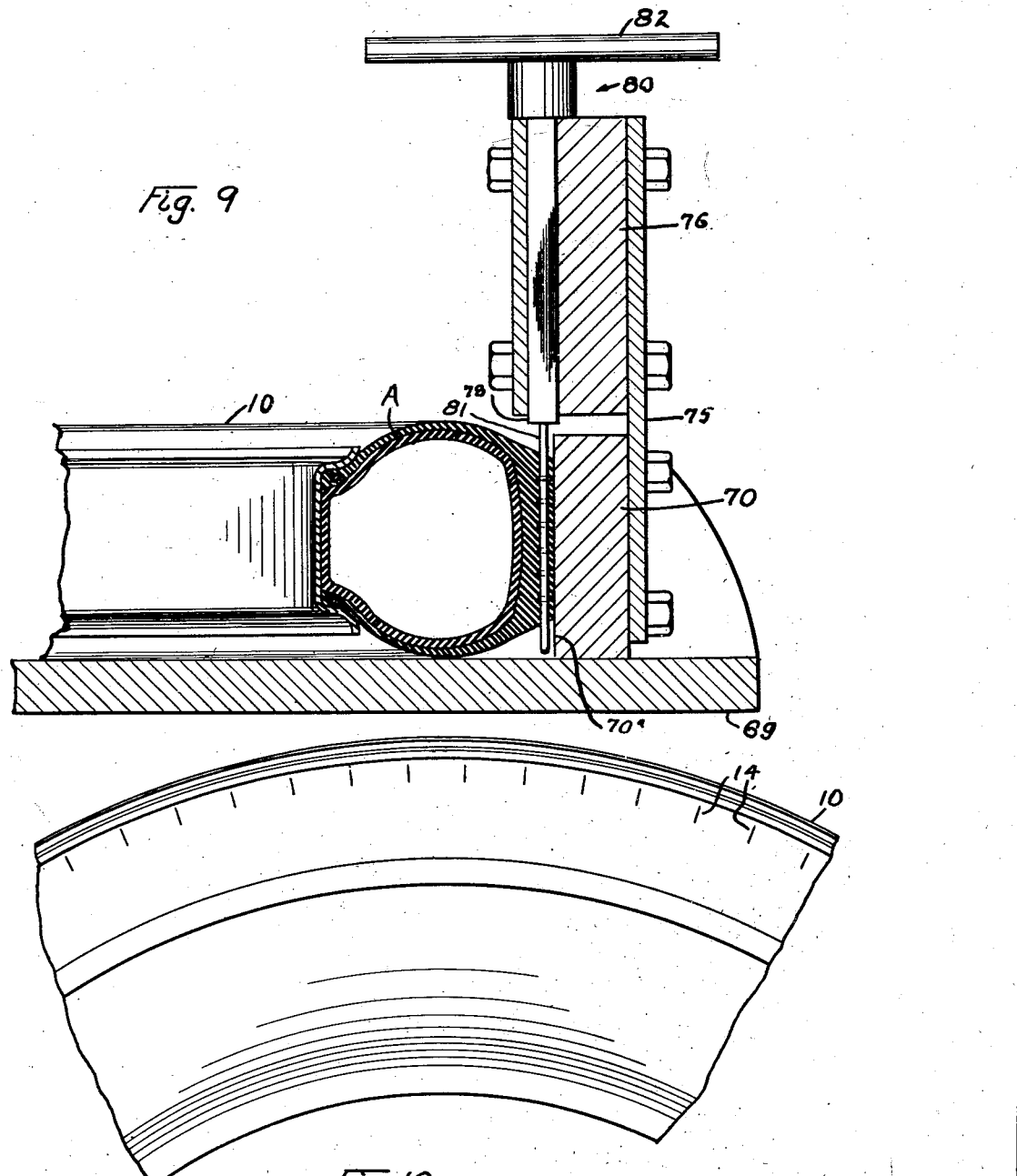
INVENTOR:
FRANK KOVACS.
BY
ATTORNEY Patented Aug. 14, 1945

2,382,069

UNITED STATES PATENT OFFICE 2,382,069

APPARATUS FOR MANUFACTURING TIRES

Frank Kovacs, Akron, Ohio, assignor to Seiberling Rubber Company, Barberton, Ohio, a corporation of Delaware Original application May 25, 1942, Serial No. 444,439. Divided and this application June 26, 1944, Serial No. 542,206

4 Claims. (Cl. 164—86)

This invention relates to pneumatic tire structures of vulcanized rubber or the like and, in particular, relates to apparatus for producing the same. This application is a division of application Serial No. 444,439, filed May 25, 1942.

Heretofore, new or unworn tires, in general, have had satisfactory characteristics in regard to stopping ability and traction. Differences in these characteristics may be found in various type of new tires, depending on design, but such differences are slight. It is possible to obtain improved antiskid and traction qualities in such new or unworn tires by various slitting and other tread alterations, but in the past this has been accomplished usually at the expense of obtaining other undesirable characteristics, such as noise, uneven tread wear, tread cracking, etc.

Most present-day low-pressure balloon tires have one or more continuous circumferential ribs, which upon wearing down naturally become more stiff or less flexible, and because of this stiffening of the ribs, stopping and traction values of the tire are materially reduced. The more the tread wears down, the most rigid the ribs become; and, consequently, the less the stopping and traction value becomes.

In the past, conventional tires have been provided with transverse slits or cuts in the continuous ribs thereof, but these cuts have usually extended from the ground-engaging surfaces of the ribs to the full depth of the grooves defining said ribs. Such constructions, however, have been found to be noisy and to wear irregularly. In other words, there is too much flexibility in the ribs in the early stages of tread wear. This has given rise to a suggestion by a prior patentee to cut slits in the ribs which are only about one-third the depth of the grooves and then to re-slit the tire in this manner after it has become worn to such an extent that the original slits are no longer effective.

A purpose of this invention is to provide an improved tire having one or more continuous ribs, said tire being so constructed as to give the usual desirable characteristics of the new or unworn tire, but providing ribs in such tires with slits or openings therein which do not become effective until the tire is substantially worn and then which provide flexibility in the worn ribs to continue substantially throughout the life of the tire, the desirable characteristics of traction, antiskid, uniform tread wear, silence, etc., usually present in the new and unworn tire.

Stated in another way, a purpose of the invention is to provide a tire structure of the character described which does not require renovation as it wears and in which the continuous ribs thereof have slits or openings arranged therein in such a manner that excessive flexing of the ribs is obviated at all stages of tread wear, whereby the strain on the rubber at the base of the slits, for example, caused by long continued flexing of the ribs, will not tear the rubber inwardly of the slits, through the tread, and into the carcass and thereby result in premature failure of the tire.

Another object of the invention is to provide a simple, efficient, and practical apparatus for producing transverse slits of substantially uniform depth in tire structures of the character described having transversely curved tread surfaces.

These and other objects of the invention will be manifest from the following brief description and the accompanying drawings.

Of the accompanying drawings:

Fig. 1 is an edge view of a portion of a pneumatic tire embodying the invention;

Fig. 2 is a transverse cross-section taken on line 2—2 of Fig. 1;

Fig. 3 is a cross-section taken on line 3—3 of Fig. 1;

Fig. 4 is a view similar to Fig. 3 illustrating the tread after it has become substantially worn;

Fig. 9 is a cross-section taken substantially on line 9—9 of Fig. 5; and

Fig. 10 is a side elevation of a portion of the tire structure shown in Figs. 1 and 2.

Figure 5:
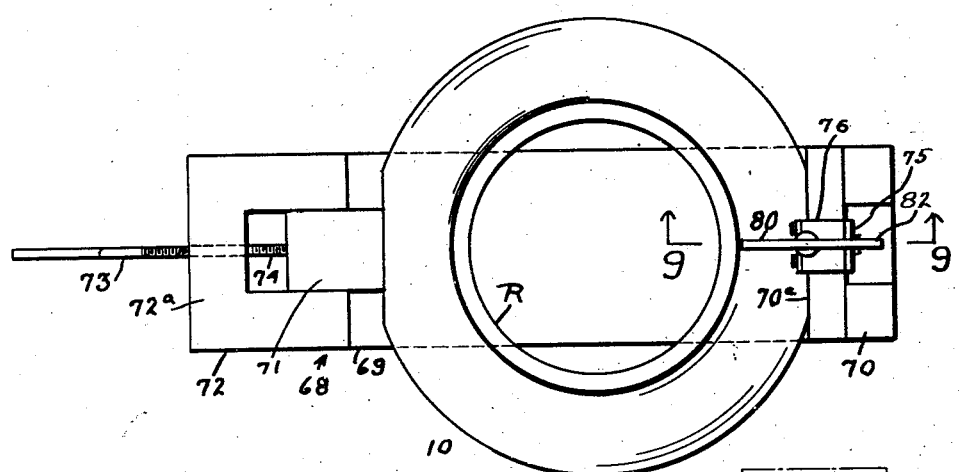
Fig. 5 is a plan view of apparatus for manufacturing pneumatic tires in accordance with the invention.

Referring to the drawings, a tire embodying the invention is illustrated in Figs. 1 to 4, inclusive. The tire shown is a standard type on the market and comprises the usual carcass construction 10 on which is a tread 11 formed with a series of grooves 12, 12 so formed and spaced as to divide the tread into a plurality of continuous ribs 13, 13 having serrated or saw-tooth nonskid edges. The depth of the grooves 12, or height of the ribs 13, and the width of the ribs determined by the spacing of the grooves, are such that the tread in a new tire will have a high degree of flexibility and wiping action, and the sharp or serrated edges of the ribs will afford ample traction and nonskid qualities. The tread will wear uniformly and will be substantially noiseless in its operation.

But as such a tread wears down, the ribs 13 become less and less flexible, and, in accordance with the present invention, these ribs are slitted as indicated at 14. In the specific embodiment shown, these slits 14, 14 extend completely through all of the ribs of the tread from one side or shoulder of the tread to the other. The slits preferably are of the order of two-thirds of the height of the ribs 13, extending from the bottom of the grooves outwardly to within one-third the height of the ribs from the outer or wearing surface of the tread. The slits 14 have no effect whatever upon the normal operation of the tire or upon its usual tread characteristics until the tread has worn down one-third of the height of the ribs, whereupon the slits 14 become effective and divide the worn ribs into a plurality of separate blocks which provide for sufficient flexibility to maintain substantially the original tread characteristics of the new or unworn tire.

It is to be understood that in tires of different types with different treads and utilizing different compounds, there may be variation in the height of the slits 14 and that these may extend down into the tread inwardly of the bottoms of the grooves 12, such changes or modifications being contemplated by the present inventor, and being changes in degree within the spirit of the present invention.

The invention may be embodied in many types of tires and in many different arrangements. For example, slits corresponding to the slits 14 in Figs. 1 to 4 may be formed in the tread so as to extend through ribs from the opposite sides or shoulders toward the center, and are not caused to pass through the center rib, which may be left continuous throughout its height. The breaking up of the side ribs into separate blocks by means of the slits may be ample to maintain substantially the desirable characteristics of the tread throughout the life of the tire or until the tread has been completely worn away.

In another form of the invention, in a tire formed with continuous ribs, slits corresponding to slits 14 are formed through the ribs from opposite sides or shoulders of the tire in staggered relationship. This is a variation which will be immediately understood by skilled artisans since nonskid formations of various types are frequently staggered on opposite sides of the tire.

In a tire having a tread comprising central circumferential ribs and side nonskid blocks which are circumferentially discontinuous, the slits may be extended through the ribs from the side or shoulders of the tire in any suitable manner and, in doing so, may be extended through any portion of the side projections which is raised on the tread. The slits will thus provide the desired action in the ribs and will not substantially affect the normal operation of the side nonskid blocks.

In tires formed with central nonskid projections which are circumferentially discontinuous and with continuous ribs in the shoulders, the ribs may be slit without altering the central nonskid projections.

It will be understood that in all forms of the invention as disclosed in the above paragraphs and as shown in the figures of the drawings referred to, the ribs are slit substantially in the manner indicated in Figs. 2, 3, and 4 so that the slits in all of these tires do not become effective until there has been a substantial wear on the tire, reducing the heights of the ribs whereby they would otherwise be too stiff and inflexible to provide the desired tread characteristics. The ribs of the various types of tires discussed may be provided with other outer nonskid slits, slots, nicks or grooves as desired to obtain the desired original tread characteristics, but the slits of the present invention should be substantially discontinuous with such outer nonskid slits, slots or grooves.

Tires, in accordance with this invention, may be produced by various procedures, either during the vulcanization thereof or subsequently, and by the use of many different types of equipment. The preferred procedure consists in forming the slits in the tread of the tire after vulcanization by flattening the tread and causing one or more knives to pierce the flattened tread from one side to the other thereof or inwardly from opposite sides of the tire toward the center, as may be desired or required.

Figure 6:
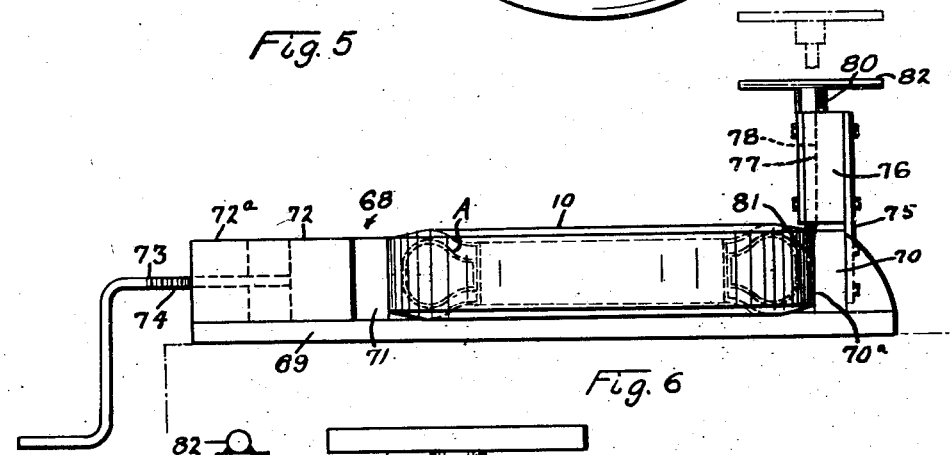
Fig. 6 is a front elevation thereof.
Figures 7, 8:
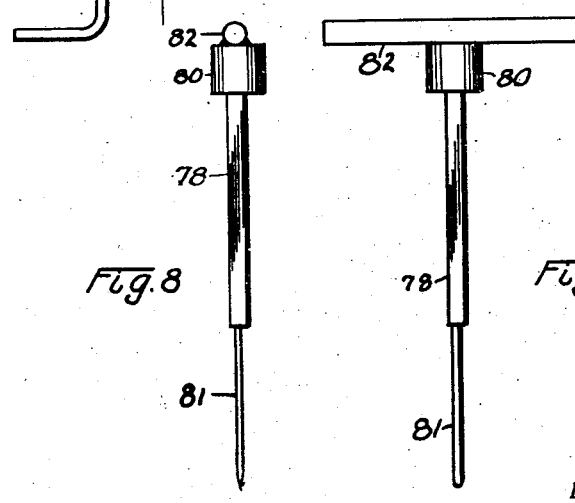
Fig. 7 is a front detail view of a slitting tool used with the apparatus shown in Figs. 5 and 6.
Fig. 8 is a side view of the tool shown in Fig. 7.

Suitable procedure and equipment for this purpose are illustrated in Figs. 5 to 10, inclusive. This equipment comprises a clamping device 68 having a base portion 69, the latter having a fixed upright 70 at one end, and a block 71 slidably mounted in a U-shaped member 72 fixed on the other end thereof to be shiftable toward and from upright 70. The tire 10, for example, shown in Figs. 1 to 4, inclusive, and Fig. 6, may be placed between the upright 70 and the shiftable block 71, said tire first being mounted on a rim R and inflated by means of an inner tube A. By means of a crank 73 having a portion 74 threaded through a crosspiece 72$^a$ on member 72, the inner end of the threaded portion 74 is engageable with the slide block 71 for urging the same toward the fixed upright 70. By turning the crank 73, pressure is applied at diametrically opposite points of the tire to flatten out a substantial portion of the normally curved outer tread portion thereof at the point where it is urged against a flat inner surface 70$^a$ of upright 70.

Mounted on a plate 75 secured to the upright 70 may be a block 76 having a vertically extending squared recess 77 slightly inwardly of face 70$^a$ of the upright 70 for receiving a squared stem 78 of a slitting tool 80, said tool having a blade 81 secured to the lower end of stem 78, and having a suitable handle 82. The blade 81 of tool 80 may be relatively flat and of such proportions, as best shown in Figs. 3 and 4, for forming slits of desired size in the tire 10. By means of handle 82, the tool 80 may be urged downwardly in openings 77 to pierce blade 81 transversely through the tread portion 11 of the tire 10, the arrangement being such that the blade forms a transverse slit 14 through the tread in a plane substantially at a 90° angle to the ground-engaging surface of the tire, (see Figs. 6 and 9) the outer edge of the slit 14 preferably being inwardly of the flat surface 70$^a$ of upright 70, a distance equivalent to about one-third the height of the tire rib, as previously described. A series of circumferentially spaced slits 14 may be formed in the spaced ribs 11 of the tire in this manner (see Figs. 1 to 4 and 10), the above described operation being repeated as the tire is progressively shifted and clamped on the device 68. When the tire is released from the device 68, the slits 14 will naturally conform to the transverse curvature of the tire section, as best shown in Fig. 2. With slight modifications, the apparatus shown and described may be utiliized for forming a plurality of slits in the tire with a single stroke of the slitting tool.

It is to be understood that by means of apparatus substantially as described the slits 14 may be formed to extend at various angles to the ground-engaging surface of the tire. Similarly, the slits may be of varying depths at different points between the tire shoulders, or the outer edges of the slits may be at varying distances from the ground-engaging surface of the tread to vary the amount of flexibility required at different points in the tread as may be desired in certain tread designs. Also, the slits may be extended through tread portions of the tire at angles to transverse radial planes through the tire.

Thus has been provided an improved tire construction and apparatus for manufacturing the same. The continuous outer portions of the ribs give the new or substantially unworn tire the same characteristics as a standard unslit tire. As the tread wears down, however, which stiffens the ribs, the transverse slits or openings of the improved tire become exposed at the ground-engaging surfaces of the ribs, providing additional non-skid edges and worn-rib flexibility to maintain the fore mentioned desirable characteristics in the tire.

Modifications of the invention may be resorted to without departing from the spirit thereof or the scope of the appended claims.

What I claim is:

1. Apparatus for slitting pneumatic tire treads, comprising a support for supporting a tire, means on said support operable to apply pressure against the tread surface of a tire supported thereon to flatten an area of the tread, a rectilinear cutter, and means for mounting said cutter to be shiftable to provide a transverse slit through said flattened area of the tread.

2. Apparatus for slitting pneumatic tire treads, comprising a support for supporting a tire, means including a member shiftable against the tread surface of a tire on said support to flatten an area of the tread, an element adjacent said shiftable member and transversely shiftable toward and from said tire, a rectilinear cutter mounted on said element, and means for shifting said element to move said cutter to provide a transverse slit or slits in the tire tread at said flattened area.

3. Apparatus for slitting pneumatic tire treads comprising a support for supporting a tire, a relatively fixed anvil on said support having a flat surface to be substantially at right angles to the plane of a tire mounted on said support, means on said support operable relatively to urge a tire on the support against said anvil to flatten an area of the tire tread against said flat surface, an element mounted in association with said anvil to be shiftable in the direction of the plane of said flat surface of the anvil, a rectilinear cutting blade on said element to be shiftable transversely of said flat surface of the anvil, for cutting a transverse slit or slits in the tire tread at said flattened area thereof.

4. Apparatus for slitting pneumatic tire treads comprising a support for supporting a tire, a relatively fixed anvil on said support having a flat surface to be substantially at right angles to the plane of a tire mounted on said support, means on said support operable relatively to urge a tire on the support against said anvil to flatten an area of the tire tread against said flat surface, an element mounted in association with said anvil to be shiftable in the direction of the plane of said flat surface of the anvil, a rectilinear cutting blade on said element to be shiftable in spaced relation to said flat surface of the anvil for cutting a transverse slit or slits in the tire tread at said flattened area beneath the tread surface thereof.

FRANK KOVACS.